(12) United States Patent
Dodworth

(10) Patent No.: US 11,397,000 B2
(45) Date of Patent: Jul. 26, 2022

(54) LASER PROJECTION SYSTEM

(71) Applicant: LIGHTWAVE INTERNATIONAL, INC., Eighty Four, PA (US)

(72) Inventor: George Dodworth, Eighty Four, PA (US)

(73) Assignee: LIGHTWAVE INTERNATIONAL, INC., Eighty Four, PA (US)

( * ) Notice: Subject to any disclaimer, the term of this patent is extended or adjusted under 35 U.S.C. 154(b) by 0 days.

(21) Appl. No.: 16/541,957

(22) Filed: Aug. 15, 2019

(65) Prior Publication Data

US 2020/0041112 A1 Feb. 6, 2020

Related U.S. Application Data

(63) Continuation of application No. 15/127,783, filed as application No. PCT/US2015/021904 on Mar. 21, 2015, now abandoned.

(Continued)

(51) Int. Cl.
*F21V 23/04* (2006.01)
*G01J 1/42* (2006.01)
(Continued)

(52) U.S. Cl.
CPC .......... *F21V 23/0457* (2013.01); *F21V 21/15* (2013.01); *F21V 25/00* (2013.01);
(Continued)

(58) Field of Classification Search
CPC ............... H04N 9/3161; H04N 9/3194; F21K 9/00–90; H01S 3/0071; H01S 3/101; H01S 3/1305; H01S 5/0071; H01S 3/0014; H01S 3/10015–1003; H01S 5/06825; H01S 5/0683; G02B 27/20; G21V 21/15; F21V 2101/00; F21V 23/0457; F21V 25/00–10;
(Continued)

(56) References Cited

U.S. PATENT DOCUMENTS 4,817,098 A * 3/1989 Horikawa .............. G11B 7/126 372/31
5,585,605 A * 12/1996 Williams ................. B41J 2/442 178/18.09

(Continued)

OTHER PUBLICATIONS

Schulmeister, "The Apparent Source—A Multiple Misnomer", Mar. 2005, Proceeding of the International Laser Safety Conference, 91-98. (Year: 2005).*

(Continued)

*Primary Examiner* — Joshua King
(74) *Attorney, Agent, or Firm* — Michael G. Monyok

(57) ABSTRACT

A laser projection system having built-in safety systems is disclosed. Further disclosed is a method of operating a laser projection system such that safe operation is a factor only of meeting a threshold distance between the laser unit and an audience member. To accomplish safe operation at the threshold distance, the laser projection system is pre-calibrated to operate below maximum permitted exposure levels at the threshold distance. In this manner of operation, laser lighting can be accomplished by non-laser professionals without the complexity, external sensors, and need for calibration at the venue.

12 Claims, 11 Drawing Sheets

Related U.S. Application Data

(60) Provisional application No. 61/968,823, filed on Mar. 21, 2014.

(51) Int. Cl.
*G01J 1/26* (2006.01)
*G01J 1/24* (2006.01)
*F21V 21/15* (2006.01)
*F21V 25/00* (2006.01)
*G02B 27/20* (2006.01)
*H01S 3/00* (2006.01)
*G01J 1/02* (2006.01)

(52) U.S. Cl.
CPC . *G01J 1/24* (2013.01); *G01J 1/26* (2013.01); *G01J 1/4257* (2013.01); *G02B 27/20* (2013.01); *H01S 3/0014* (2013.01); *H01S 3/0071* (2013.01); *G01J 2001/0285* (2013.01)

(58) Field of Classification Search
CPC ... G01J 2001/4247–4252; G01J 1/4257; G01J 2001/4261
See application file for complete search history.

(56) References Cited

U.S. PATENT DOCUMENTS

| | | | | |
|---|---|---|---|---|
| 5,778,017 A * | 7/1998 | Sato | ............. | G06K 1/126 372/31 |
| 8,743,920 B2 * | 6/2014 | Koshi | ............. | H01S 5/0683 372/29.011 |
| 2002/0167974 A1 * | 11/2002 | Kennedy | ............. | H01S 3/2232 372/10 |
| 2005/0024704 A1 * | 2/2005 | Sakai | ............. | G02B 26/0808 359/212.1 |
| 2006/0159140 A1 * | 7/2006 | Machida | ............. | H01S 3/0602 372/33 |
| 2006/0291510 A1 * | 12/2006 | Juluri | ............. | H01S 5/0683 372/29.021 |
| 2008/0106654 A1 * | 5/2008 | Benner | ............. | H04N 9/3129 348/745 |
| 2008/0123708 A1 * | 5/2008 | Benner | ............. | H04N 9/3129 372/38.09 |
| 2012/0274937 A1 * | 11/2012 | Hays | ............. | G01S 17/58 356/337 |
| 2013/0039374 A1 * | 2/2013 | Lutgen | ............. | H01S 5/02288 372/43.01 |
| 2013/0272332 A1 * | 10/2013 | Weichmann | ............. | B23K 37/006 372/38.02 |
| 2016/0018258 A1 * | 1/2016 | Goldsmith | ............. | G01J 1/4257 356/121 |

OTHER PUBLICATIONS

City Theatrical, "AutoYoke", Feb. 10, 2012, https://www.citytheatrical.com/Products/2012/02/10/autoyoke—(Year: 2012).*

* cited by examiner

LASER PROJECTION SYSTEM

CROSS-REFERENCE TO RELATED APPLICATIONS

The present application is a Continuation of application Ser. No. 15/127,783, filed Sep. 20, 2016 which claims the benefit of PCT Patent Application Number PCT/US2015/21904 filed on Mar. 21, 2015 which claims the benefit of U.S. Provisional Application Ser. No. 61/968,823, filed Mar. 21, 2014, all of which are incorporated by reference herein in its entirety.

STATEMENT REGARDING FEDERALLY SPONSORED RESEARCH

Not applicable.

BACKGROUND OF THE INVENTION

The field of the invention relates generally to laser projection systems. More specifically, the invention relates to laser projection systems that are used in various venues to conduct a light show, wherein the laser light is projected into the audience to enhance the experience of the show.

Current regulations in the United States and other countries require an expert to own and operate a laser projection system. Regulations are required because most projection systems are capable of causing injury if not calibrated, set-up, and operated properly. As such, projection systems are operated by laser safety officers who are recognized by the U.S. Food and Drug Administration (FDA).

Currently, the operator must hold a special variance from the FDA to project any laser light into an audience member's eyes to ensure maximum permitted exposure levels are not exceeded. The current method of audience scanning (technique for safely shining lasers into the audience) further requires extensive training by the laser safety officer and an abundance of specialized hardware to operate. In practice, the laser safety officer installs the laser projection system at the venue, conducts tests of the equipment, and measures the light output at various locations where audience members are expected to be during the show. The process is time consuming and exposes other workers to potentially dangerous laser light. It would therefore be advantageous to develop a laser projection system and a method of operation that reduced the need for extensive on-site set-up and testing while still ensuring the safety of audience members.

BRIEF SUMMARY OF THE INVENTION

The present invention offers lasers "to the masses" in a simple, self-contained, easy to deploy, easy to control, and safe package. Most importantly, the laser projection system and method of the present invention satisfy all safety regulations. The laser projection system, in the preferred embodiment, comprises a laser unit mounted in a motorized yoke, an optics device, and a calibration interface. The calibration interface allows the laser safety officer to adjust the laser power output, minimum scanning velocity, maximum scanning dwell duration, and other parameters of the laser which could affect safety.

To operate the laser projection system, the operator supplies a power source and connects the unit to a standard lighting controller, such as a Digital Multiplex (DMX) controller. DMX is a standard for digital communication networks that are commonly used to control stage lighting and effects. In alternative embodiments, other controller interfaces are provided, such as an ethernet-based interface such as ArtNet, by example. The commands supplied by a lighting designer or other operator trigger a built-in server in the laser projection system to provide pre-programmed lighting effects.

The laser projection system can be safely operated through a combination of a built-in safety system that monitors the output of the laser and pre-calibration of the laser. During pre-calibration, a laser safety officer sets the parameters of the laser based on a pre-determined distance. For example, a laser operator can choose 30 feet as the threshold distance, then proceed to calibrate the laser to ensure any lighting effect at a distance of 30 feet or greater from the laser source is safe for the audience. The calibration can occur at a location separate from the venue where it is intended to be installed.

Because the laser projection system has been pre-calibrated for a set distance, a user simply has to ensure that the laser projection system is installed at the minimum distance or greater from the audience. No further on-site testing is required. To prevent the laser parameters from being changed, the laser projection system is provided with anti-tampering devices that prevent anyone other than the laser safety officer from accessing the optics or laser calibration interface.

In alternative embodiments, the laser source is calibrated to function more as an extended source rather than a point source, an inherent quality of lasers. Extended source lighting does not present the ocular risks that point source lasers do. As a result, a laser projection system operating as an extended source can be mounted and operated like a traditional lighting fixture, regardless of distance.

DETAILED DESCRIPTION OF THE INVENTION

Figure 13:
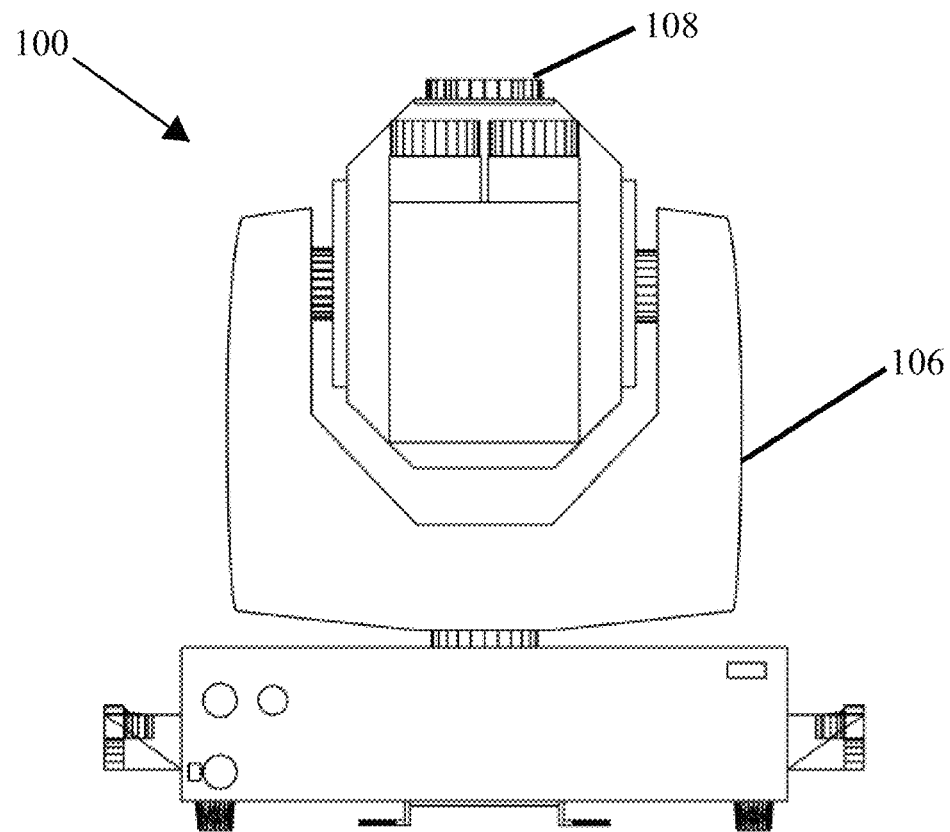
FIG. 13 is a schematic of a laser projection system according to one embodiment of the present invention.

Disclosed herein is a laser projection system 100 comprising a laser source 101 configured to safely shine laser light onto an audience. The laser projection system 100 further comprises, in some embodiments, a monitoring system 102, a calibration interface 103, a vector scanning engine (galvanometers), diverging optics 108, and a safety system 104. The calibration interface 103 allows a laser safety officer, or other user, to set safe operating limits. As a failsafe during operation, the safety system 104 can limit maximum source power, maximum dwell time, and minimum beam velocity to prevent any unnecessary risk of exposure to an audience member in the event an operator attempts to project content that is unsafe for the audience or the system experiences a malfunction. The safety system 104 is further able to monitor the integrity of the system voltages, scanner error, and shutter state. The Professional Audience Safety System offered by Pangolin Laser Systems is an example of a safety system 104 that can be used in the laser projection system 100 of the present invention. FIG. 13 is a schematic representing the laser projection system having a motorized yoke 106, according to one embodiment.

Figure 1:
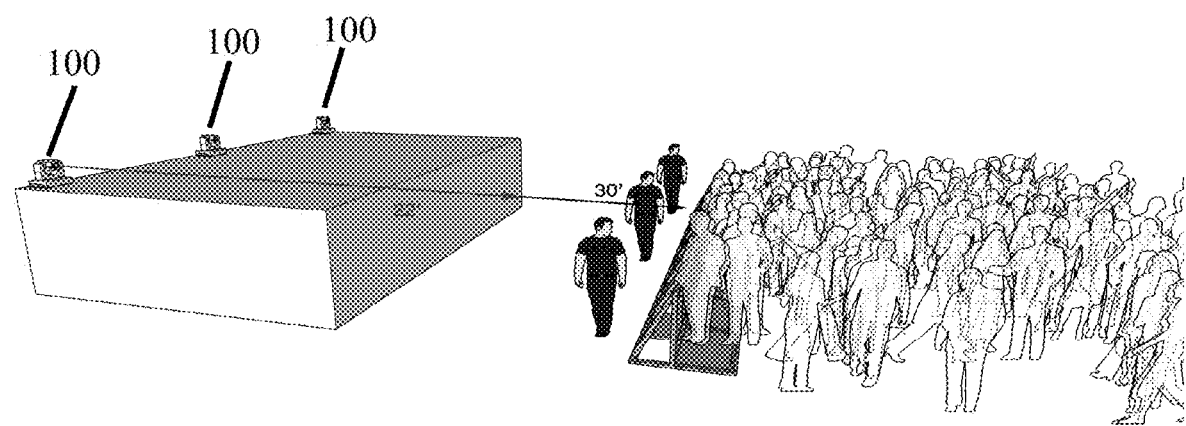
FIG. 1 shows the laser projection system according to one embodiment of the present invention, wherein the system is installed at a distance from the audience.

In one embodiment, the method of operating the laser projection system 100 comprises installing the projection system 100 at a fixed distance relative to a crowd. As shown in FIG. 1, multiple laser projection systems 100 are installed on a stage at a distance of 30 feet from the nearest audience member. Prior to installation, a certified laser safety officer calibrated each unit to provide safe operation beyond 22 feet. A buffer distance of 8 feet is provided in the installation example shown in FIG. 1 to allow safe operation in the event an audience member breaches the security barrier. Alternatively, if site-specific regulations require on-site calibration, the units can be calibrated after installation.

Figure 2:
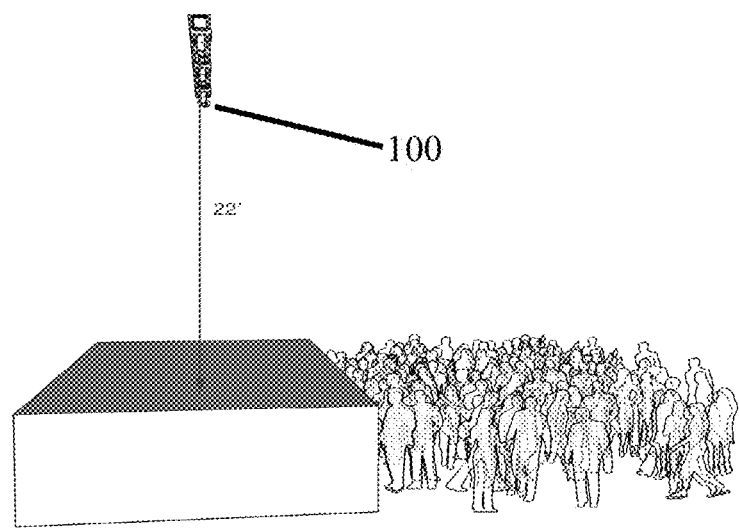
FIG. 2 shows an alternate installation of the laser projection system.
Figure 3:
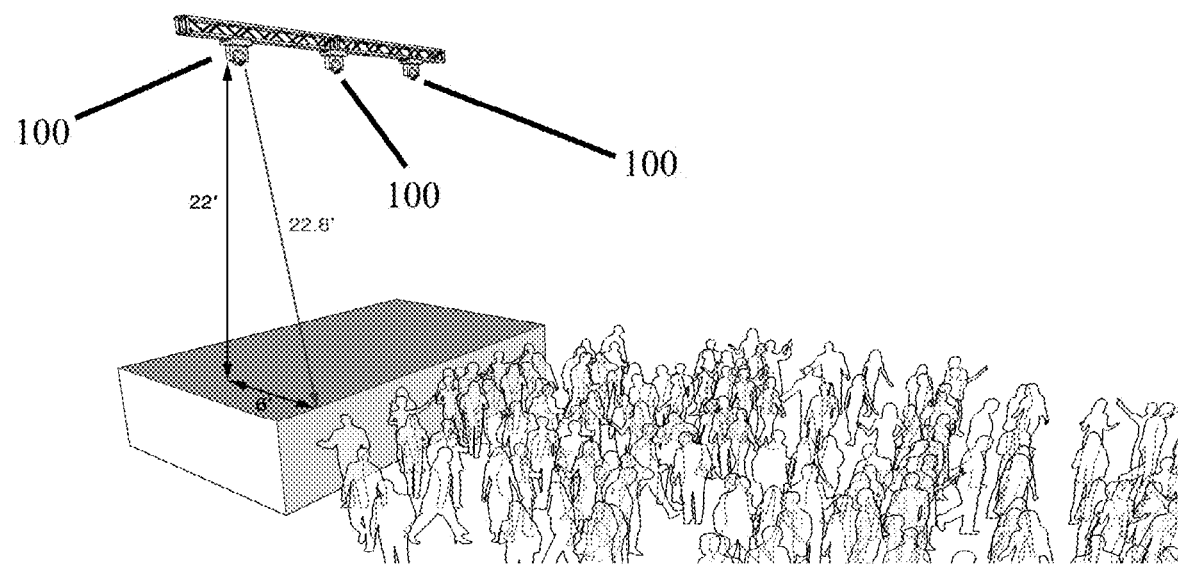
FIG. 3 shows yet another alternate installation of the laser projection system.
Figure 15:
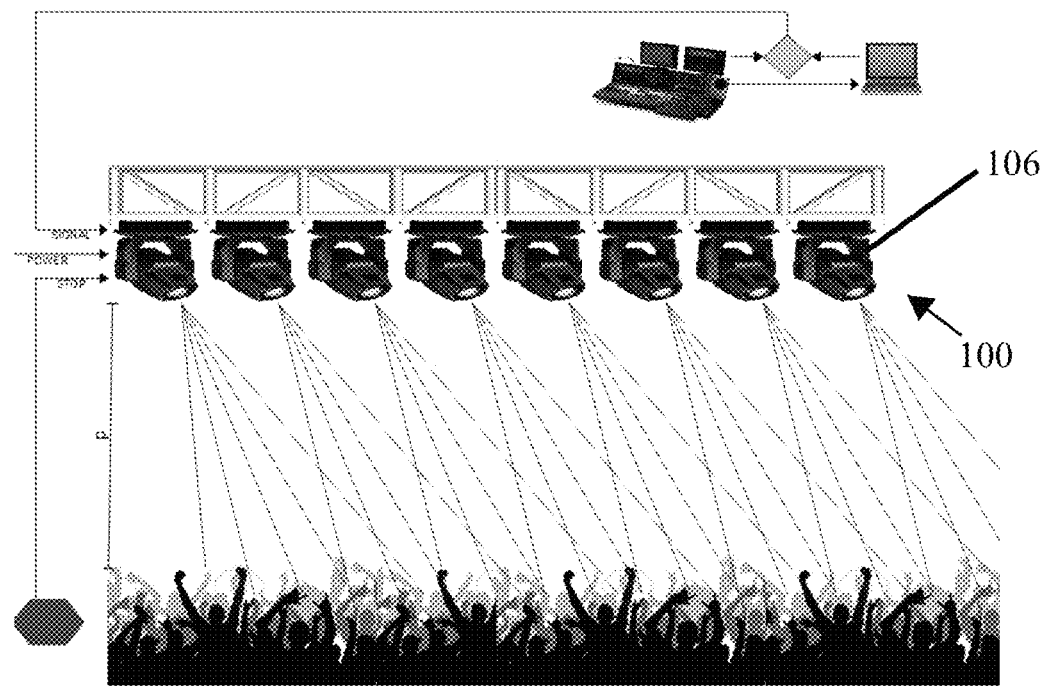
FIG. 15 is an alternate view of an overhead installation of multiple units.
Figure 16:
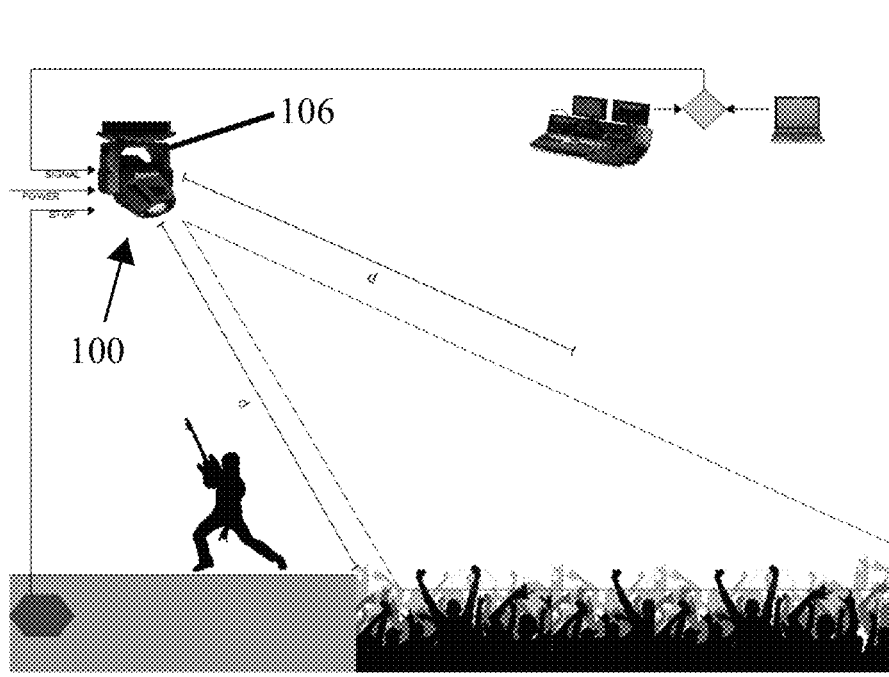
FIG. 16 shows a single unit having a motorized yoke in an overhead installation.
Figure 17:
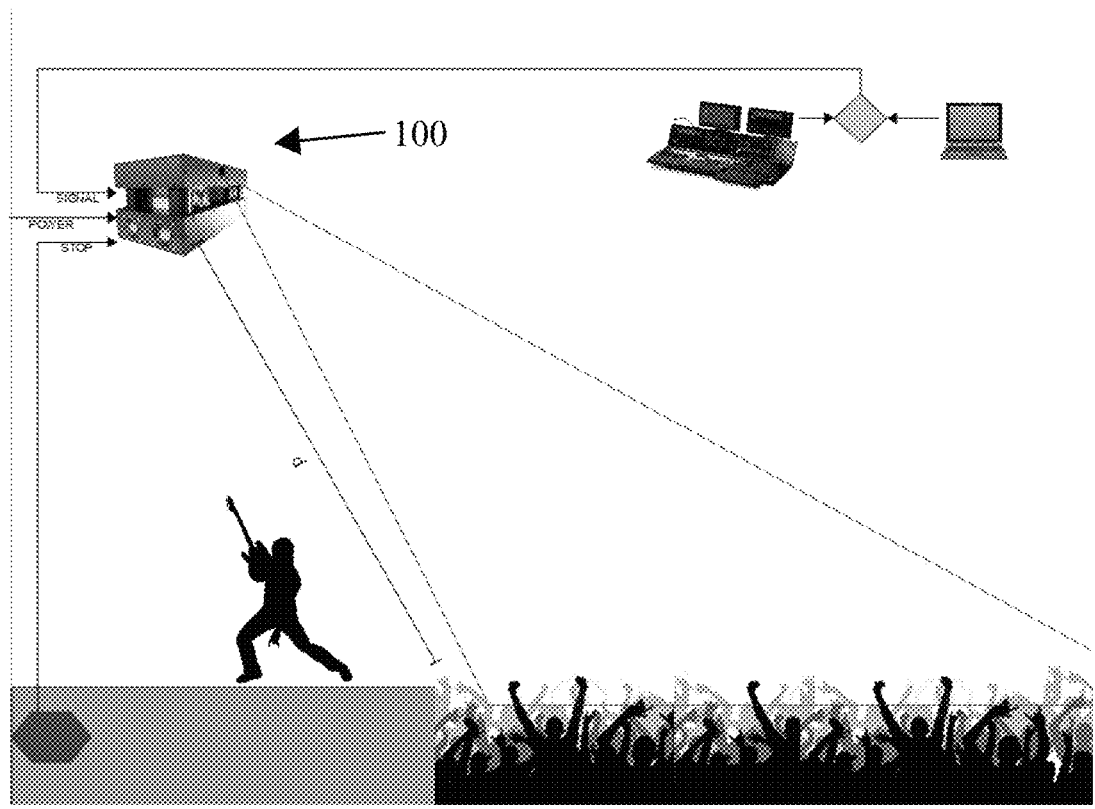
FIG. 17 shows a single unit without a motorized yoke in an overhead installation.

FIG. 2 shows an alternative installation of the plurality of laser projection systems 100. In this example, the units are mounted on a truss above a stage. With the units mounted overhead, it is more difficult for an audience member to encroach into the safety distance. As such, an additional buffer is not provided. FIG. 3 is an alternative view of the installation shown in FIG. 2, showing that the distance from the front of the laser projection system 100 to the nearest audience member is greater than the installation height, due to the setback distance from the front of the stage. FIG. 15 shows a similar installation of the laser projection systems 100 mounted to a truss above an audience. In all of FIGS. 15-17, the distance between the laser source 101 and the audience is visible for various embodiments of the system 100. For example, FIG. 15 shows multiple systems 100 having a motorized yoke 106, FIG. 16 shows a single system 100 having a yoke 106, and FIG. 17 shows a single system 100 without a yoke 106.

Figure 4:
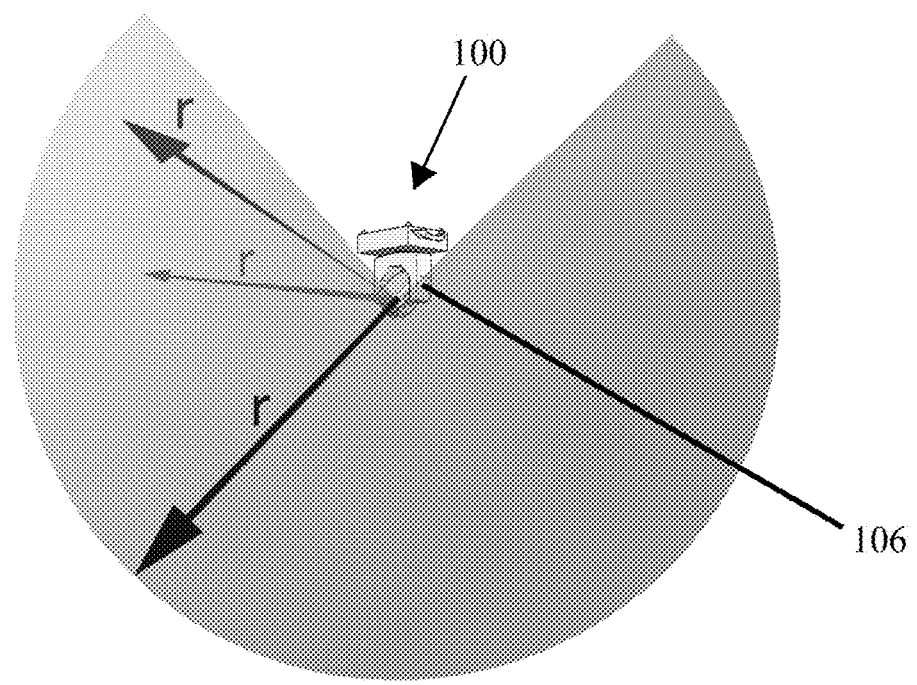
FIG. 4 is a schematic showing the minimum safety distance in multiple directions surrounding a laser projection system.

FIG. 4 represents the safety zone around a laser projection system 100 according to one embodiment in which a laser source is mounted on a motorized yoke 106. Because the yoke 106 is capable of moving the laser source 101 in all directions, the safety distance must be observed in three axes. Current systems are not installed on motorized yokes 106 because it is difficult for the laser safety officer to account for the number of variables in calibrating the machine. However, according to the method of the present invention, the laser safety officer calibrates each unit for a set, pre-determined distance, such that the laser is safe regardless of the position of rotation within the yoke 106. As shown in this example, power levels of the laser are not based on the region into which the laser is projecting. In prior art systems, laser output is often increased when projected above the audience, but attenuated when directed onto the audience.

With the system 100 calibrated for safety at any distance beyond a threshold distance, the opportunities for use of laser units in lighting effects is greatly increased. Instead of a laser safety officer installing, testing, and calibrating each unit, a stage hand can install the unit as he would with a typical light source. The only factor the stage hand must be cognizant of is the distance to the audience in the location of installation. The complete integrated system is self-contained, plug-and-play, and ready to operate. Because of the built-in safety, the laser projection system can use lighting industry standard controls (such as DMX or ArtNet) or International Laser Display Association (ILDA) standards as an option.

Figure 5:
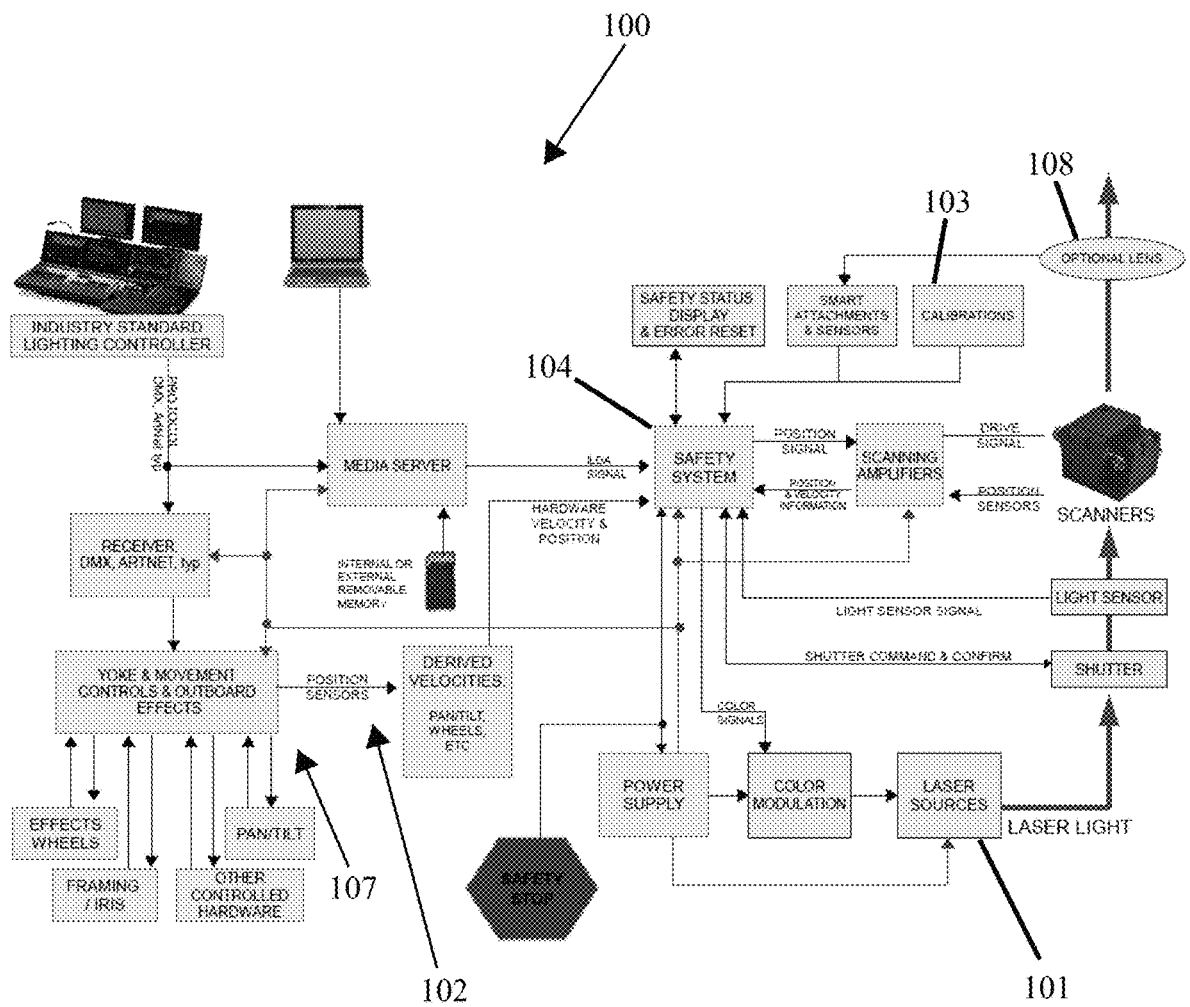
FIG. 5 shows a block diagram of the laser projection system according to one embodiment of the present invention.

Referring to FIG. 5, a block diagram representing one embodiment of the present invention is depicted and shows several state-of-the-art components. At the heart of the system is a laser source 101, such as a solid state laser, which projects through a shutter and light sensor onto a scanner. The scanner contains a front surface mirror that is able to reflect the laser light in different directions. At adequately fast speeds, the scanner is able to utilize human persistence of vision to create effects, such as drawing shapes or letters onto a projection surface, or three dimensional volumes of light in the air such as sheets, tunnels, or beams. The laser light exits the system through an optics system 108. The optics system 108 can be an integral part of making the laser system 100 safe, to the extent that lenses have the ability to alter the divergence of a laser beam. More divergent beams are inherently safer, but decrease intensity by reducing irradiance in relation to distance from the laser, which is the power density of the light in Watts per meter squared. The divergence of a beam is used in connection with other beam parameters, such as power and dwell time to determine the maximum permitted exposure level that may be directly viewed by entry into the occulus of an audience member.

Other components of the laser projection system 100 interact with the safety system 104 to ensure proper operation. As shown on FIG. 5, sensors, or monitoring system 102, that measure light output, scanner position and velocity, yoke position, shutter operation, and wheel effects, to name a few, are input into the safety system 104. If the safety system 104 detects a state of operation that would expose an audience member to a level of laser light exposure that exceeds a maximum permitted level, the safety system attenuates the beam through operation of the shutter, reducing power, reduction of dwell time, or temporarily terminating operation. In the system 100 shown in FIG. 5, a shutter driver controls operation of the shutter.

Control of the laser projection system 100 can be accomplished by an industrial standard lighting controller connected to a media server with Ethernet and external media inputs. In alternative embodiments, the laser source 101 is mounted in a motorized yoke 106, which can be controlled by a separate interface connected to the lighting controller.

A global smart lens or other attachments are optional to respond to physical changes of the environment.

Figure 6:
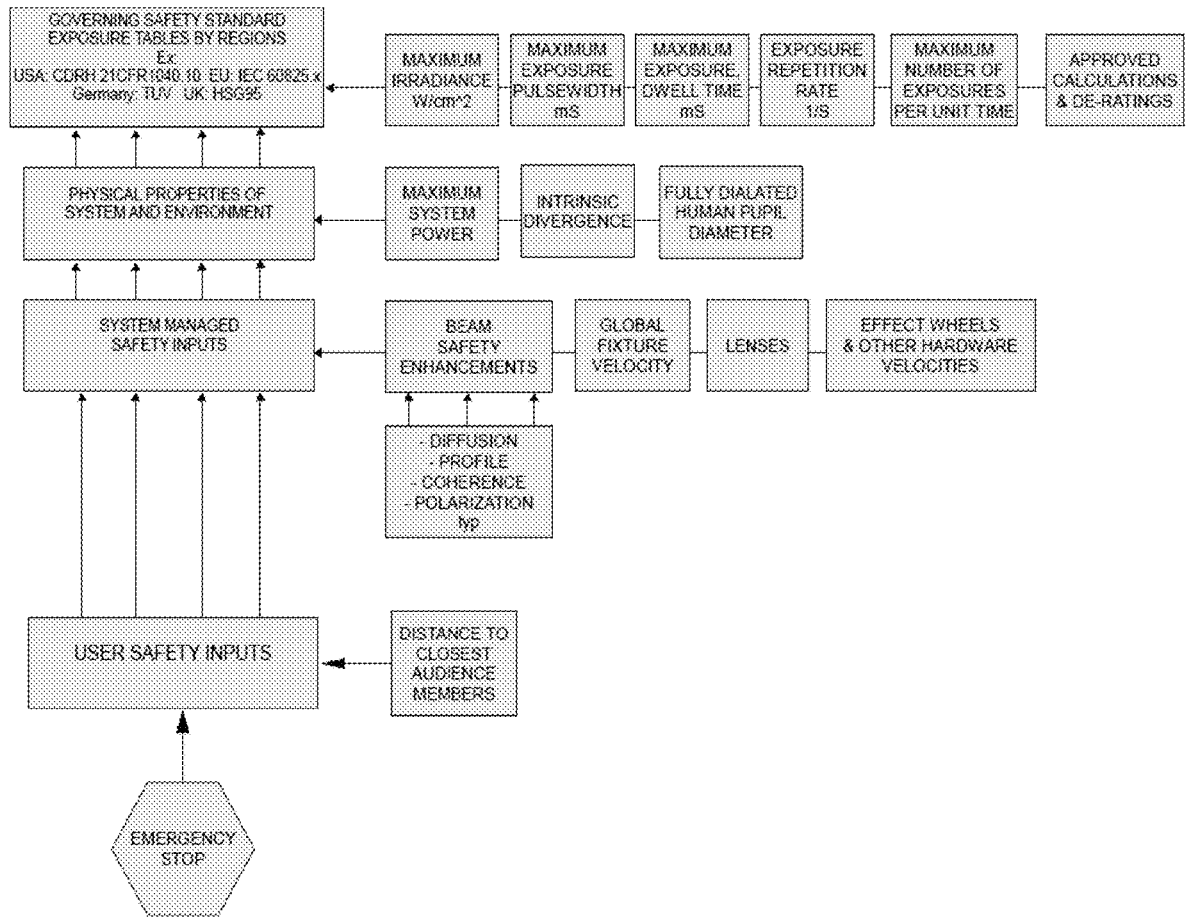
FIG. 6 is a logic diagram of the safety features of the laser projection system.

FIG. 6 is a flow diagram showing the inputs that factor into meeting applicable governmental safety standards. The inputs include user safety inputs, system managed safety inputs, and physical properties of the system and environment. For the system of the present invention according to one embodiment, the only user safety input is the distance from the laser unit to the closest audience member. For embodiments employing an extended source laser, there are no user safety inputs. System managed inputs relate to the calibration of the laser projection system and include items such as lenses, optics, effects wheels, and laser beam diffusion, profile coherence, and polarization. Physical properties relate to items such as exposure expected for a fully dilated human pupil, intrinsic divergence, and system power. Safety standards are set to define a maximum permitted exposure and are a factor of maximum irradiance (expressed as power per area), maximum exposure pulse width (time), maximum exposure dwell time (time), exposure repetition rate (unit per time), and approved calculations and ratings.

Figure 14:
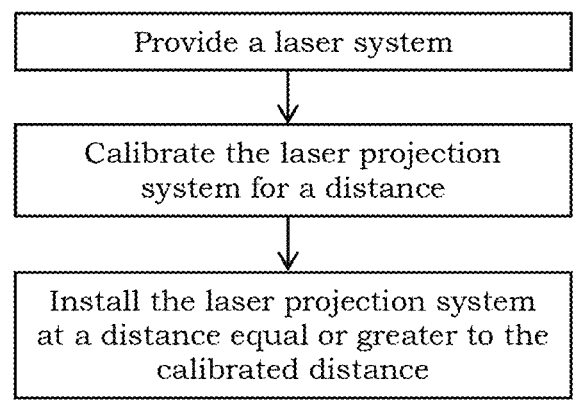
FIG. 14 is a flowchart of the method of operating the laser projection system.

In the preferred method of operating the laser projection system, each of the safety inputs are encoded, or pre-calibrated, through a calibration interface 103 into the system 100 such that only the user safety input (i.e. distance) has to be met in order to achieve safe operation as defined by applicable governing standards. That is, the operation of the laser projection system will be safe if the system is installed at a pre-determined distance from the audience. FIG. 14 is a flowchart depicting the basic steps of this process. To further protect the integrity of the pre-calibration and to prevent any tampering or modification of the values by the operator, the pre-calibration settings can be stored in a non-volatile memory or set using fixed components values in the controlling circuits such that only the manufacturer or laser safety officer are able change the pre-calibration values. If the settings are stored digitally in a memory of the unit, the unit can adjust to a smart accessory, such as a lens, that is recognized by the unit. For example, the laser projection system may recognize the addition of a lens having a certain power and use a calibration table created by a laser safety officer for that particular lens.

Figure 7:
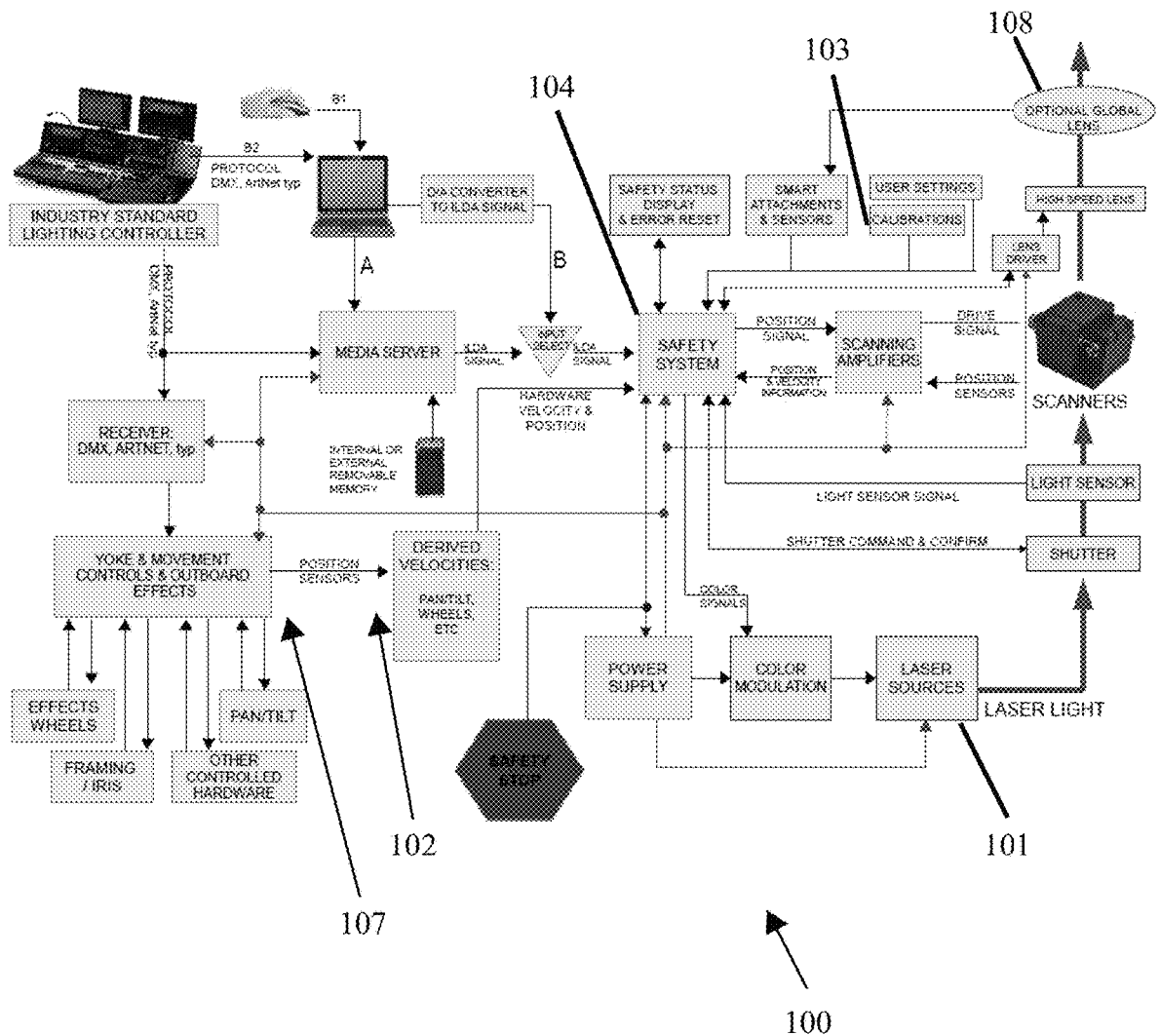
FIG. 7 shows a block diagram of an alternate embodiment of the laser projection system.

FIG. 7 shows a component block diagram of an alternative embodiment of the laser projection system 100. This system 100 has similar components to the system shown in FIG. 5, but with the inclusion of controls to change user settings for manual calibration of the system by the laser manufacturer or laser safety officer and a motorized lens which can dynamically change beam size or divergence. In addition, external computer inputs are provided which allow updated programming content to be sent to the media server. In this configuration, the external computer can behave as an external server according to the user input or the industrial standard lighting controller's protocol.

In alternative embodiments, the laser projection system can comprise the following features:

Standard pan/tilt/rotate lighting yoke as is typically used in standard lighting fixtures;

Safety systems that incorporate data from yoke sensors to increase laser beam brightness based on yoke velocity;

Yoke controls from industry standard DMX, ArtNet, or Ethernet control protocols;

Imbedded laser media server, containing preprogrammed cues;

Laser control based on industry standard DMX, ArtNet, Ethernet, Contact Closure, RS232, RS485, or other commercially available control protocols;

Bypass control where the laser source is controlled from an external input such as an ILDA connector; and Optics system 108 to obtain audience safety at a given distance.

During the pre-calibration process, the system can be calibrated, tested, and audited by a laser safety officer with full laser safety officer training, knowledge, and experience to calculate and determine all maximum permitted exposure (MPE) factors in accordance with applicable standards, such as ANSI Z136.1 and/or IEC 60825-1.

The trained and experienced officer shall determine and confirm through testing that the MPE level is not exceeded with the desired laser effect both in normal operation of the laser, and in various failure modes such as improper input from the operator or failure of a scanner. If a scanner fails, the maximum dwell time may be exceeded, for example. To account for these possible failures, an operator should present the scan protected laser with worst-case control inputs such as static beams, low scan rate beams, and high dwell time beams. Thus, in the pre-calibration process, the officer ensures that the calibration of the scan fail system will provide safe, sub-MPE output, in all cases of normal operation or even during equipment failures and in all audience areas.

The pre-calibration process is performed in the context of a pre-determined threshold value. For example, one individual laser projection system 100 may be calibrated for a distance of 30 feet. At this distance, which represents the minimum audience separation from the laser, the officer optimizes the various calibration calculations by selecting the appropriate laser power from those available in inventory, and adjusting the laser divergence. The final adjustment is achieved, if necessary, by adjustment of the minimum velocity and/or the maximum dwell time via the audience scanning protection system. Any combination of these variables may be used to safely calibrate the laser projection system 100.

While the laser projection system 100 can be calibrated at a location separate from the venue, it is possible for the laser projection system to be calibrated on-site, like traditional systems. On-site calibration may be required by regulators in the jurisdiction in which the system is installed, for example. In these situations, a laser safety officer would calibrate the machine to be safe at for the distance between the audience and the point of installation.

A sample calculation performed by the officer, for on-site or off-site calibration, is as follows, by way of example, for a 30 foot separation distance:

Total source laser power: 600 mW

Wavelength: 400-700 nm (Tab. A.1 IEC60825-1, Ed. 3, 2007-03 applies)

Table applies to exposure times from $5 \times 10^{-6}$ S to 10 Seconds

Nearest Audience Location: >10 Meters

Beam Diameter at source: 3 mm minimum (*prior to lens)

Beam divergence: 10 mRad minimum

Beam diameter at closest audience location: 10 cm minimum

Angular velocity for scan protection device: 10 radians/second minimum

Beam Mode: Tophat or other non-ideal, non-gaussian profile (worst-case calculation)

Linear velocity of beam at closest location: 10 Rad/s×10 m=100 m/s=10,000 cm/s

Since the beam is larger than the eye aperture (100 mm>7 mm) the duration of ocular exposure is the diameter of the beam divided by the linear speed. For a more conservative approach, the officer can include additional worst-case transit time for a nonideal tophat profile equal to ½ of the eye's diameter. This is a more conservative calculation than a traditional full width at half maximum (FWHM) exposure. Where eye diameter=7 mm=0.7 cm Beam size=10 cm Linear Speed=10,000 cm/second (0.35 cm+10 cm)/10,000 cm/second=1035 uS Exposure to eye For retinal thermal limits, visible wavelengths 400-700 nm: MPE=18 $t^{0.75}$ J/m$^2$ $t$=0.001035 Seconds Single pulse energy=18× 0.001035$^{(0.75)}$ J/M$^2$=0.1039 J/m$^2$ Converting to more familiar units: MPE=0.0139 J/m$^2$/10, 000 cm$^2$/m$^2$=10.386×10$^{-6}$ J/cm$^2$
Simplified worst-case exposure analysis (normal operation) 600 mW×0.001039 seconds=621 uJ.
Area of 10 cm diameter spot=78.54 cm$^2$
621 uJ/78.54 cm$^2$=7.9068 uJ/cm$^2$ (Top hat profile)
So, MPE$_{single\ pulse}$=10.386 uJ/cm$^2$: and actual exposure=7.79068 uJ/cm$^2$ This exposure is 76% of the MPE for a single pulse and is acceptable. Using the data calculated above, the worst case scenario of a scanner failure can be further analyzed. Note that this is also a conservative calculation for the dwell limit calibration which is set on the scan protection device. (minimum dwell time plus failure reaction time calculated here)
Prior Data:
600 mW emitted power 10 cm beam diameter=78.54 cm$^2$
MPE$_{single\ pulse}$=10.386 uJ/cm$^2$: and actual exposure=7.79068 uJ/cm$^2$ (76% of permitted MPE)
Analysis:
Irradiance of beam at closest audience location: 600 mW power/78.54 CM$^2$=7.639 mW/cm$^2$
Area of 7 mm aperture=0.385 cm$^2$, so power to aperture=7.639 mW/cm$^2$×0.385 cm$^2$=2.94 mW
The scan protection system, or safety system 104, is specified and tested to terminate output within 10 uS. When maximum dwell time is 1 ms, or 1000 uS, the total time to terminate output is 1010 uS. This is a conservative analysis demonstrating a static beam exposure. In reality one scanning axis could remain moving, and even a failed scanner may take 100-200 uS or more to come to a stop. In alternative embodiment of the laser projection system 100, the movement of the entire yoke assembly 106 provides additional safety.
Static Beam Exposure as a Worst Case:
2.94 mW×0.00101 Seconds=2.94 uJ
MPE for 1010 uS=18 $t^{0.75}$ J/m$^2$=18×0.00101$^{0.75}$=0.102 J/m$^2$=10.2 uJ/cm$^2$
MPE energy through a 7 mm aperture: 10 uJ/cm$^2$×0.385 cm$^2$=3.85 uJ.
In this case, the exposure of 2.94 uJ is less than the MPE of 3.85 uJ. This exposure is
MPE via 7 mm aperture=3.85 uJ, while exposure via 7 mm measurement aperture=2.94 uJ
The exposure for a minimum dwell time calibration and/or a scanner failure is demonstrated to be 76.4% of the maximum permitted MPE.

After applying the adjustments to the system 100, the laser safety officer, or other technician, verifies the calibration by taking necessary measurements (static beam irradiance, minimum velocity, and maximum dwell, for example) at the point of minimum audience separation using a power meter and pulse measuring equipment. In this manner, an officer can pre-calibrate audience scanning failsafe systems prior to shipment.

A pre-calibration process has several advantages over the current method of calibrating and testing the laser on sight. For example, calibration of an audience scanning failsafe system requires a base measurement of an unprotected static beam. This means a full power beam from an unprotected system must be presented in the live show setup environment for testing and calibration of the system 100, requiring the stage and/or venue to be cleared of all non-essential personnel. Pre-calibration eliminates the need for this high powered beam to be introduced into the live show environment. The use of naked, high power beams, which are required for baseline irradiance measurements, are best reserved for a controlled facility as opposed to live venues.

Figure 11:
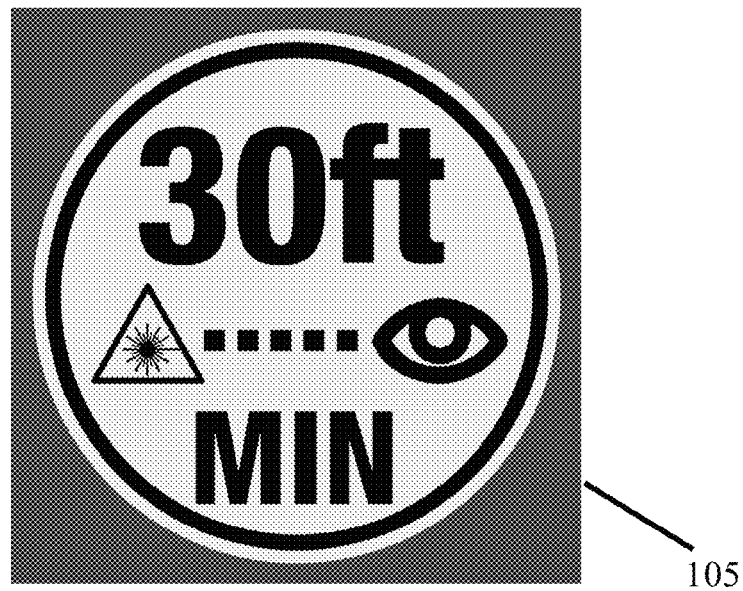
FIG. 11 is a sample warning sticker that can be affixed to the laser projection system.
Figure 12:
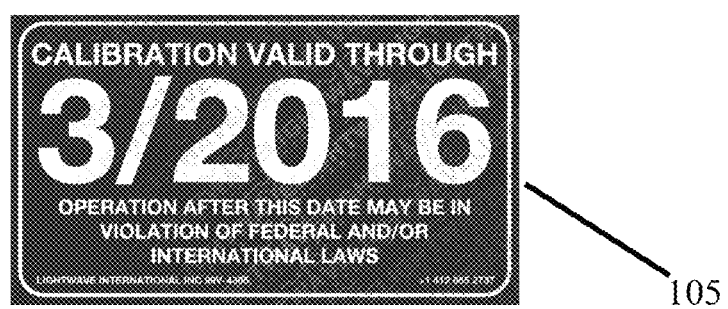
FIG. 12 is a sample calibration sticker that can be affixed to the laser projection system.

After pre-calibration is completed, a sticker or other form of notification can be affixed to the laser projection system to provide instructions for the installer. A sample warning sticker is depicted in FIG. 11. In addition, a calibration verification sticker can also be affixed to the laser projection system; a sample calibration sticker is shown in FIG. 12. To prevent tampering, the stickers or labels are provided with security features, such as holographic overlays and foil backing, which causes the sticker to be destroyed if removal is attempted. As a result, the stickers and labels act as a type of anti-tampering device 105.

The calibration sticker provides notice that the laser projection system 100 is safe for a given distance. However, in one embodiment, the systems 100 can also be audited on an annual basis to ensure the emissions meet MPE requirements and any deviations shall be recorded in a maintenance log for that device. In the situation where devices 100 are sold or rented to other operators, the devices can be returned to the manufacturer or receive a visit from certified laser safety officer for annual calibration. Failure to maintain calibration would preclude the device from further use in commerce until such calibration is performed.

To prevent unauthorized access to the laser projection system after it has been calibrated, tamper-proof hardware 105 is provided. For example, the calibration interface 103 can be secured behind a locked assess panel. Alternatively, the calibration may be stored into a non-volatile memory, or by using fixed component values in the controlling circuits such that only the manufacturer or laser safety officer may change the calibration values. The tamper-proof hardware 105 should be provided for any component of the system capable of making adjustments and would include the lenses and optical elements 108 as well.

Alternatively, the laser projection system 100 can be matched to physical modifiers, such as lenses. For example, the laser safety officer can create discrete safety pairs. That is, for a calibrated system MPE might be reached at 30' with a power 2 lens. A different calibration would allow for MPE delivery at 25' with a power 3 lens. It extends that the calibration for each scenario for a given system follow the lens power. Accordingly, the calibration for each distance may be incorporated into the lens via an active electronic component and sensor integrated into the projector 100. In this manner, the calibration at a given distance may not be defeated by any user, offering an additional layer of safety and redundancy. Such a system may also automatically display the safe separation distance on a highly visible display so that the laser safety officer, operator, staff, and inspectors have no doubt as to the proper required separation.

Pre-calibration creates an inherently safer system. With traditional techniques, a laser safety officer may feel compelled to eliminate certain steps of the calibration process, assuming there will be no problems. For example, a technician under pressure from a fast-paced production that expects impossible installation schedules might cut corners, thinking "I have done this a dozen times, and it always measures perfectly." While this situation might be rare, it still presents a risk should there be a malfunction or if the system is used outside of safe specifications for the show conditions such as being too close to the audience, having excessive power levels, or using too low of a divergence of the beam.

Figure 8:
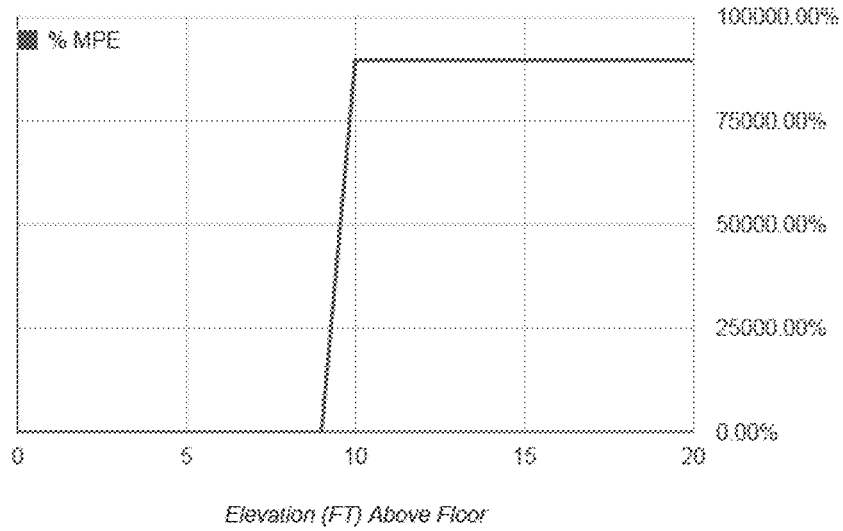
FIG. 8 is a chart depicting the exposure level to a high power laser for a given distance.
Figure 9:
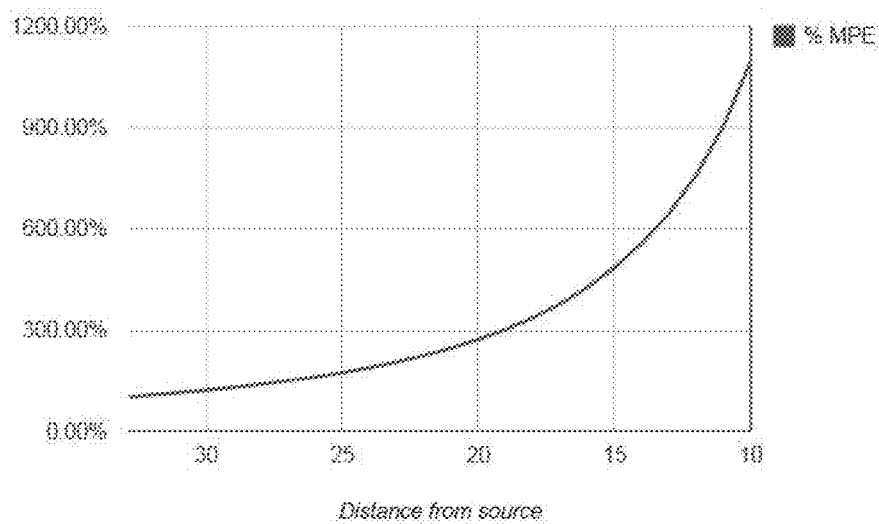
FIG. 9 is a chart depicting the exposure level to a laser similar to one of the present invention for a given distance.
Figure 10:
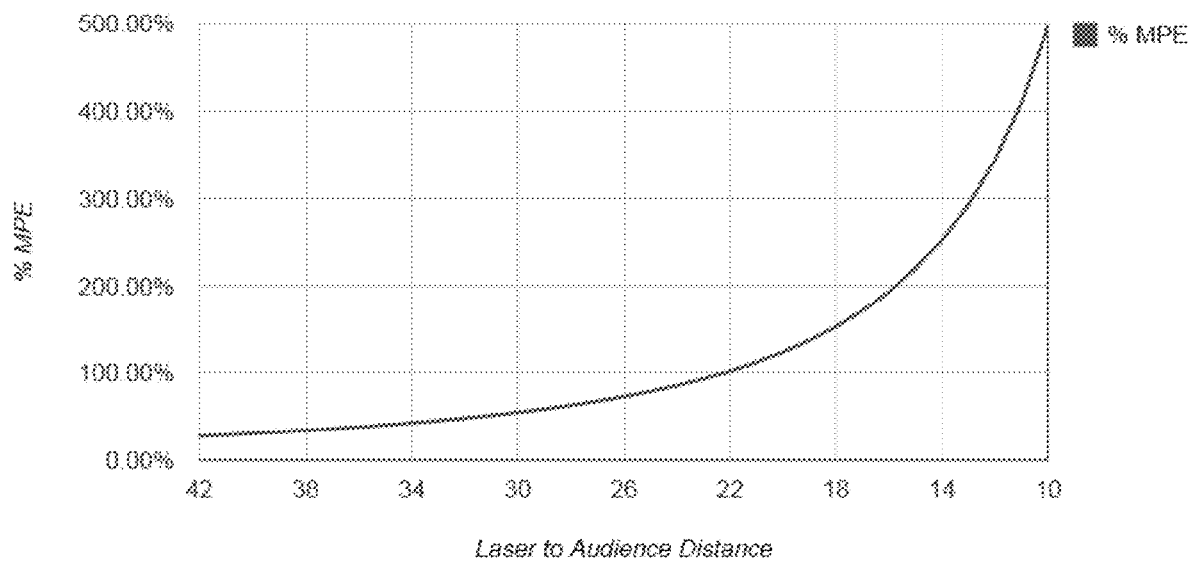
FIG. 10 is an alternate chart depicting the exposure level to a laser similar to one of the present invention for a given distance.

FIGS. 8-10 show the relative safety of the laser projection system of the present invention, as compared to high-powered systems, such as Class III/IV lasers. In FIG. 8, it is shown how the transition from a safe show to a disastrous exposure of ~90,000% MPE is only protected with approximately 3 ft of separation for a 6 ft tall audience member for a typical Class IV terminated show. FIGS. 9-10 show the exposure level for a laser of the system of the present invention, where exposure levels increase gradually as distance decreases.

A mild penetration of the minimum separation distance increases the exposure, but at a much slower rate. For example, if an audience member crosses a security barrier, the effect of making the transition to unsafe space is visible and known to both the operator and the audience member. Given the gradual risk to exposure, security personnel and the lighting operator would have more warning time before the person reached significantly hazardous space than a penetration of a class IV zone, which could be instantaneous. Moreover, protected systems at a typical height when rigged in a truss may be impossible to reach for violation of the safety buffer. If the operator can insure that the safety distance is maintained, than all other areas of audience performance, and airspace, are automatically clear. The operator's area of concentration is significantly reduced, improving the inherent safety of the system.

Additional safety procedures can be incorporated into the laser projection system to prevent excessive exposure despite proper calibration by a laser safety officer. An external shutter is triggered if the scanner power supply voltage and scanning safety system voltage are not in range, a scanner failure is detected, or the emergency stop is activated. Moreover, the laser source can be blanked (i.e. pulled to ground) to dynamically intervene if the scanner velocity or dwell time drop below a pre-calibrated threshold or the projected image is too small, indicating an insufficient velocity.

In addition, the laser scanner may be mounted into a moving yoke assembly 106 with position and velocity measurements sampled from the moving yoke. Such a yoke 106 may employ up to three axes of rotation, but typically employs two axes of rotation. Position and velocity are measured on each axis and processed by the safety monitoring system. The resultant velocity vector is compared against the calibrated minimum velocity (10 Radians per second, for example) and dwell time (1.0 mS for example). Processing of the additional velocity vectors is identical in procedure to the methods employed by the traditional two axis system. Additional axes, especially those offered by high inertia moving axes, increase safety due to the increased decay time until zero stasis is reached. Such high inertia movements have decay times ranging from milliseconds to seconds and are magnitudes of order slower to reach zero velocity than electromechanical scanners. Increase of time to reach zero velocity increase the intrinsic safety of the system since the system has a much longer time to react when an unsafe condition or default are detected.

Moreover, the laser scanner may be mounted on a linear trolley system with up to three additional dimensions of freedom, but typically with only one or two dimensions. Position and velocity measurements are sampled to determine linear velocity. Such inputs are provided to the safety monitoring system. The resultant velocity vector is compared against the calibrated minimum velocity (10 Radians per second, by example) and dwell time (1.0 mS by example). Processing of the additional velocity vectors is identical in procedure to the methods employed by the traditional two axis system.

As a result, the complete integrated system could contain up the three axis of rotation, and three dimensions of linear translation. Therefore a system could contain up to 8 velocity inputs including the laser scanners. However, additional frames of reference could be incorporated such as a truss with global movement, or installation into a moving vehicle. A protected audience scanning system, by example, is easily demonstrated to decrease exposure when installed in a moving trolley system or vehicle which may be found in a movie set environment. Precision measurement of these additional movements allows for safer exposures, and additional redundancies. Such freedom of movement cannot be incorporated in traditional projection systems, which must be safely calibrated for a static, non-moving installation.

While the safety of the laser projection system 100 has thus far been described in terms of a pre-determined distance of separation between the laser source and the audience, safety can be achieved by purposefully degrading the inherent qualities of the laser beam. As the divergence of a laser is increased, through the use of optics and the geometric design of the optical system, the laser beams makes a transition to becoming less laser-like.

In typical systems, the builder endeavors to perfect the properties of the laser, not purposefully degrade them. Those properties include the size of the apparent source and the divergence, polarization, and coherence of the beam. An ideal laser has an apparent source that is a single point, or point source. As a point source, an ideal laser has near zero divergence. This property, however, is limited by the physical properties of the source such as the beam profile, the m^2, and the diffraction limit for the source's wavelength. A typical entertainment laser might have a divergence of 0.5-2 mRad, which is quite small and non-diverging. With such a small divergence, the aesthetic qualities of the light are maintained over long distances. Typical lasers are further defined by a coherence of the light source, as well as perfectly controlled polarization.

From the viewpoint of safety, an ideal laser is the most dangerous to direct ocular viewing. Such an ideal source focuses almost perfectly on the retina of the observer due to the lenses of the eye, creating a power density on the retina that is many times the density of the incident beam to the occulus. Such an exposure may cause immediate and permanent damage to the retina.

An alternative embodiment of the present invention increases safety by intentionally disturbing the ideal qualities of the laser light source. This approach is counterintuitive to the conventional design of lasers, but the result is that the laser can be made to be safe for direct viewing. To accomplish this task, the angular subtense of the laser source 100 is increased, which has the effect of transitioning the laser from a point source to an extended source.

An extended source does not resolve or focus to a diffraction limited dot on the retina as is seen with a traditional laser's point source structure. Instead, a laser that is constructed to perform as an extended source simply images on the retina. That is, the occulus is presented with a more familiar type of light such is found in the natural world, and this light source projects a pattern onto the retina much like viewing a distant object. This is a broad departure from the behavior of a traditional laser which has a destructive focusing ability and destroys the retinal tissues.

The calculation of the angular subtense is normally performed as a safety measurement to determine safe areas of viewing for traditional lasers. For example, a doctor performing surgery may see some laser light from the side of his instrument despite the working beam being directed towards the patient and away from the doctor. In this example, it is not intended for the doctor to view a direct beam. While the exposure to the doctor is much lower than the exposure to the patient, the doctor's exposure is unwanted collateral exposure and is not intended.

In a similar manner, a laser source for direct viewing can be made safe by having it function as an extended source, or one where the maximum angular subtense exceeds 100 milliradians. In other words, the divergence of the laser beam is increased to degrade its point source qualities.

In the context of laser light shows, direct exposure to laser beams allows audience members to experience beautiful and compelling lighting effects. These effects may be presented with traditional laser beams by carefully controlling the properties of the beam to insure that MPE levels are not exceeded. This is achieved, for example, by limiting total power and limiting the time of exposure. These restrictions are required due to the focusing effects of a traditional laser on the retina. The retina requires adequate time for cooling via conduction of heat to surrounding tissue and the cooling effects of active blood flow in the retina.

In an alternative embodiment of the present invention, the laser beam emanating from the system 100 can have an angular subtense greater than 100 mRad. With a subtense greater than 100 mRad, the dangerous focusing effects are eliminated and the light may be treated as a traditional light source, or extended source. A laser in this regime of operation presents a large effective image to the retina that is well within the retina's ability to cool without an exposure time limitation or the risk of injury, removing the exposure limitations that are imposed on conventional point source lasers used for entertainment purposes. Thus, the laser projection system 100 of the invention does not require a limitation on exposure time or power level. More importantly, laser projection system does not require any specialized training or certification for operation from the relevant regulators, such as the FDA in the United States, the TUV in Germany, or Health 86 Safety in the UK.

When a laser has an angular subtense that is less than 100 mRad, it is no longer considered an extended source. However, the transition from a point source laser to an extended source laser is not an abrupt change. It is possible to allow a laser with an audience scanning safety system 104 to increase delivered power while maintaining safe MPE levels by calculating the relationship between increased angular subtense and allowable power increase.

The allowable increase in laser exposure is calculated by multiplying a coefficient 'c' times the standard MPE calculation: $MPE = 18 \, ct^{0.75} \, J/m^2$. For angular subtense less than 1.5 mRad, the coefficient is equal to 1 and thus there is no change to the MPE level. For angular subtense greater than 1.5 mRad or less than 100 mRad, the coefficient is simply the ratio of measured angular subtense divided by 1.5 mRad. For example, the MPE of a projector with an angular subtense of 15 mRad is increased by a factor of ten (15 mRad/1.5 mRad=10). A laser projection system 100 between 1.5 mRad and 100 mRad would be regulated by worldwide authorities having jurisdiction, but the brightness can be increased, which improves the level of enjoyment experienced by the audience.

While the disclosure has been described in detail and with reference to specific embodiments thereof, it will be apparent to one skilled in the art that various changes and modifications can be made therein without departing from the spirit and scope of the embodiments presented. Thus, it is intended that the present disclosure cover the modifications and variations of this disclosure provided they come within the scope of the appended claims and their equivalents.

What is claimed is:

1. A system for projecting a laser onto an audience, comprising:
    a laser source;
    a motorized yoke, wherein the yoke changes an axis of projection of the laser source;
    a monitoring system,
        wherein the monitoring system observes a plurality of output parameters of the laser source;
        wherein the monitoring system generates an output signal;
    a calibration interface, wherein the plurality of output parameters of the laser source are pre-calibrated such that a laser beam emitted from the laser source does not exceed a threshold exposure level at a pre-determined distance from the laser source, wherein at least one output parameter comprises a laser source power level, which remains at a constant level for any position of the motorized yoke and any region in which the laser source is projecting; and
    a safety system that receives the output signal, wherein the safety system detects a state of operation of the laser beam based on the output signal to determine an unsafe operating condition consisting of a malfunction of a scanner or activation of an emergency stop, wherein the safety system stops projection of the laser beam when the unsafe operating condition is present.

2. The system of claim 1, further comprising:
    an anti-tampering device operably connected to the calibration interface, wherein the anti-tampering device prevents modification of the plurality of output parameters of the laser source by unauthorized users.

3. The system of claim 1, further comprising:
    a yoke position sensor that generates a yoke output signal, wherein the yoke output signal is transferred to the safety system.

4. The system of claim 1, wherein the laser beam has a subtense between about 1.5 milliradians and 100 milliradians.

5. The system of claim 1, wherein the laser beam has a subtense greater than about 100 milliradians.

6. The system of claim 1, wherein the pre-determined distance from the laser source is met in each of three axes in which the motorized yoke changes the axis of projection of the laser beam.

7. The system of claim 1 further comprising a standard lighting controller connected to the laser source and the motorized yoke.

8. The system of claim 1, wherein the laser source power level is adjusted based on yoke velocity.

9. A method of operating a laser projection system for an audience, comprising:
   providing a laser projection system, the laser projection system comprising:
   a laser source that projects a laser beam;
   a motorized yoke having a mount, wherein the laser source is secured in the mount;
   a monitoring system, wherein the monitoring system determines the exposure level of the laser beam;
   a safety cutout device that blocks transmission of the laser beam emanating from the laser source when the monitoring system detects an excessive exposure level caused by an unsafe operating condition consisting of a malfunction of a scanner;
   a calibration interface capable of altering the power output, beam divergence, and scan rate of the laser beam;
   pre-calibrating the laser projection system to prevent exposure levels exceeding a maximum threshold at a pre-determined distance from the laser source by setting a power level of the laser source, wherein the power level remains constant for all positions of the motorized yoke and any region in which the laser source is projecting;
   installing the laser projection system at a distance no less than the pre-determined distance from an audience; and
   operating the laser projection system at a constant power output for all positions of the motorized yoke.

10. The method of claim 9, further comprising:
    operating the laser projection system pursuant to a governmental variance.

11. The method of claim 9, further comprising:
    using a standard lighting controller to operate the laser projection system.

12. The method of claim 9, further comprising:
    adjusting the power output based on a yoke velocity.

* * * * *